United States Patent
Nomura et al.

[11] Patent Number: 5,995,304
[45] Date of Patent: Nov. 30, 1999

[54] PLASTIC LENS

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/092,061

[22] Filed: Jun. 5, 1998

[30] Foreign Application Priority Data

Jul. 2, 1997 [JP] Japan ................................ 9-177299
Sep. 25, 1997 [JP] Japan ................................ 9-260171

[51] Int. Cl.⁶ .................................................. G02B 17/00
[52] U.S. Cl. ........................................... 359/726; 359/642
[58] Field of Search .................................. 359/726, 824, 359/642, 811; 369/112; 385/14; 134/6

[56] References Cited

U.S. PATENT DOCUMENTS

| 5,198,916 | 3/1993 | Kim | 359/15 |
| 5,408,360 | 4/1995 | Nakanishi | 359/642 |
| 5,883,709 | 8/1997 | Okuda | 356/138 |

*Primary Examiner*—Scott J. Sugarman
*Assistant Examiner*—Y. Timothy Lee
*Attorney, Agent, or Firm*—Leydig, Voit & Mayer, Ltd.

[57] ABSTRACT

A plastic lens has a flange provided with a reflecting plane, so that its inclination upon assembling can be detected and adjusted efficiently and accurately. This plastic lens has the flange at an outer periphery of an optically functioning portion. A surface of the flange surrounding the optically functioning portion is a reflecting plane perpendicular to an optical axis of the optically functioning portion.

3 Claims, 5 Drawing Sheets

PLASTIC LENS

BACKGROUND OF THE INVENTION

1. Field of the Invention

The present invention relates to a plastic lens suitably used for an optical pickup and the like.

2. Related Background Art

Lenses which are made of plastics have conventionally been used, because they are easy to made and have some other useful reasons. In general, as shown in FIG. 8, such a plastic lens 101 has a brim-shaped flange 103 formed around an optically functioning portion 102. The flange 103 is mainly utilized as an attachment for fixing the lens 101. Also, the lens 101 has an annular wall 104 disposed around the optically functioning portion 102 in order to protect the latter.

For assembling the lens 101 to an optical pickup of a CD-ROM drive or the like, the inclination of the lens 101 is detected and adjusted. An example of process for detecting the inclination of the lens 101 will be explained with reference to FIG. 9. First, the lens 101 is temporarily assembled to a holder 106, and a reflecting glass sheet 105 is placed on the annular wall 104. The upper face of the reflecting glass sheet 105 becomes a reflecting surface which is perpendicular to the optical axis X of the lens 101. Above the reflecting glass sheet 105, near the outer periphery of the lens 101, a photosensor which has a light-sending portion S and light-detecting portion R is disposed. While the lens 101 is rotated together with the holder 106, light is emitted and incidenton the upper face of the reflecting glass sheet 105 from the light-sending portion S. And the light is reflected by the upper face of the reflecting glass sheet 105.

When the lens 101 is not tilted, the emitted light is totally reflected toward the light detecting portion R. In this case, since the light received by the light detecting portion R has a stable predetermined strength, it can be judged that the lens 101 is not tilted.

When the lens 101 is tilted, by contrast, the emitted light is hardly reflected toward the light detecting portion R. In this case, since the light received by the light detecting portion R becomes unstable and weak, it can be judged that the lens 101 is tilted. After the inclination of the lens 101 is adjusted to normal, the lens 101 is bonded and fixed to the holder 106 by an adhesive 107. In the case of a lens without the annular wall 104, a reflecting glass sheet may be formed to be mountable on the lens 101.

Since the conventional plastic lens 101 is assembled to an optical pickup or the like according to the above-mentioned process, it necessitates the step of mounting the reflecting glass sheet 105 on the lens 101 and the step of removing it therefrom. These steps inhibit the inclination of the lens 101 from being adjusted efficiently. Also, since the inclination of the lens 101 is detected and adjusted by way of the reflecting glass sheet 105, errors are prone to occur. Further, when the reflecting glass sheet 105 is deformed or its reflecting surface is damaged, normal detection cannot be effected, thus increasing the time and labor for handling the reflecting glass sheet 105.

SUMMARY OF THE INVENTION

It is an object of the present invention to provide a plastic lens whose inclination upon assembling can be detected and adjusted efficiently and accurately.

The plastic lens in accordance with the present invention has a flange formed around an optically functioning portion, and a reflecting plane which is perpendicular to an optical axis of the optically functioning portion and formed on a surface of the flange.

In accordance with the present invention, since the reflecting plane is perpendicular to the optical axis of the optically functioning portion, when the inclination of the reflecting plane is detected and adjusted by means of reflected light, the inclination of the optical axis of the optically functioning portion can be detected and adjusted easily. Also, since no special instruments such as a reflecting glass sheet are necessary for the detection, it is unnecessary to provide a step of handling these instruments, whereby the lens can be assembled efficiently. Further, since the inclination of the lens is directly detected without the aid of any special instruments such as a reflecting glass sheet, accuracy in detection can be improved so as to allow the lens to be assembled correctly.

Here, in the case where the reflecting plane is formed by a light-reflecting film, the light irradiated upon detection and adjustment of the plastic lens can be totally reflected by the light-reflecting film, thus allowing the inclination of the plastic lens to be detected and adjusted accurately. Also, in the case where the reflecting plane is formed by a light-reflecting film, the light transmitted through the flange and then reflected at the rear face of the flange (or holder surface) can be securely suppressed, whereby erroneous detection can be securely prevented from occurring due to multiple reflection.

The inclination of the plastic lens can be detected and adjusted also when the reflecting plane is formed by a glossy plane having a center line surface roughness of 0.3a or less. Here, "glossy plane" means a mirror-like plane, which has neither crack nor rash on a surface. "Glossy plane" also means the plane which is formed to be transferred a polished inner face of a molding die. Further, "glossy plane" also means the plane which is formed to be polished itself.

In the case where the surface roughness of the above-mentioned glossy plane is set to a center line average roughness of 0.3a or less. Thus, the light emitted from a photosensor can be securely reflected toward its light-receiving portion upon detecting the inclination of the lens by the photosensor. Also, as long as the surface roughness of the glossy plane is within the above-mentioned range of center line average roughness, even when the glossy plane has a slight damage or dirt attached thereto, such can be less influential.

The method of measuring center line average roughness conforms to the prescription of JIS-B0601-1982 ("JIS" means "Japan Industrial Standard"). Also, the value of center line average roughness mentioned here is indicated by the standard sequence prescribed in the prescription.

Preferably, the flange formed with the reflecting plane by the glossy plane is provided with a plurality of protect projections protruded on the glossy plane side, while each of the protect projections has a height greater than the maximum height of the optically functioning portion on the basis of the glossy plane. As a consequence, the glossy plane would not be damaged due to contact between the glossy plane and another object such as CD-ROM disc, whereby the lens inclination can be prevented from being detected erroneously due to damages on the glossy plane. Also, as the height of the protect projection is made greater than that of the optically functioning portion, not only the glossy plane but also the optically functioning portion can be prevented from being damaged due to contact between the optically functioning portion and another object, thus keeping optical performances from deteriorating due to damages on the optically functioning portion.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
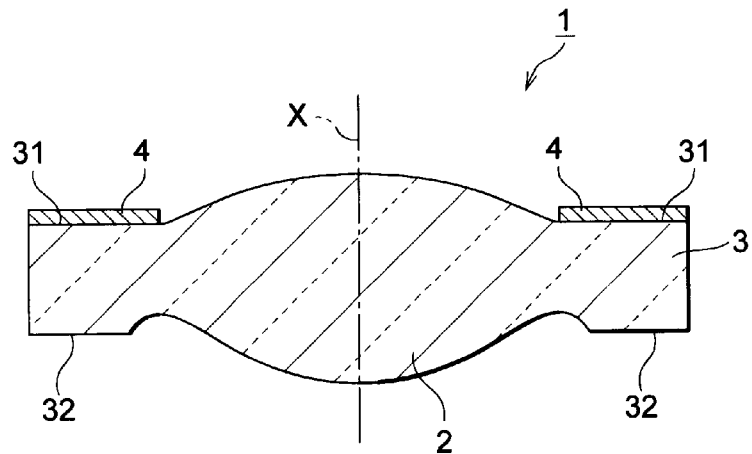
FIG. 1 is a sectional view showing a first embodiment of the plastic lens in accordance with the present invention.

In the following, embodiments of the plastic lens in accordance with the present invention will be explained.

To begin with, a first embodiment of the plastic lens in accordance with the present invention will be explained with reference to FIGS. 1–3. A plastic lens (hereinafter also simply referred to as lens) 1 shown in FIG. 1, which is a lens having a diameter of about several milimeters and used for an objective lens of an optical pickup of a CD-ROM drive or the like, has an optically functioning portion 2 functioning as a convex lens at its center. A flange 3 is formed around the optically functioning portion 2. The flange 3 acts as an attachment when attaching the lens 1 to a holder or the like.

A surface 31 of the flange 3 which becomes perpendicular to the optical axis X of the optically functioning portion 2 is provided with a reflecting plane formed by a light-reflecting film 4. The light-reflecting film4 is used for reflecting the light emitted on the surface 31 of the flange 3, and is mainly used when adjusting the inclination upon attaching the lens 1. As the light-reflecting film 4, a film of aluminum (Al coat) is employed, for example. In this case, the light incident on the light-reflecting film 4 is totally reflected without being transmitted therethrough.

The light-reflecting film 4 may be formed on the surface 31 of the flange 3 by vapor deposition or the like. For example, to the lens 1 not provided with the light-reflecting film 4, in the state where the surface of its optically functioning portion 2 and the outer peripheral surface of the flange 3 are masked, aluminum is vaporized so as to be attached to the lens 1. When the mask is removed after aluminum is deposited, the light-reflecting film 4 made of a thin film of aluminum is found to be formed on the surface 31 of the flange 3.

The light-reflecting film 4 may be made of not only the Al film but also other materials such as a dichroic mirror, as long as they can reflect the light used upon detecting the inclination of the lens 1, such as laser light having a wavelength of 633 nm or 780 nm and the like.

The rear face 32 of the flange 3, which functions as a base surface when being attached to a holder 6, is an annular plane. Since the inclination of the lens 1 is adjusted while the surface 31 of the flange 3 is irradiated with light, the rear face 32 of the flange 3 is not needed to be provided with the light-reflecting film 4. Though the light-reflecting film 4 can also be formed on the rear face 32 of the flange 3, when the light-reflecting film 4 is formed on only one surface 31 of the flange 3, the front and rear faces of the lens 1 can be easily identified through visual observation, thus making it easier to handle the lens 1.

A process of detecting the inclination of the plastic lens 1 upon attaching will now be explained.

Figure 2:
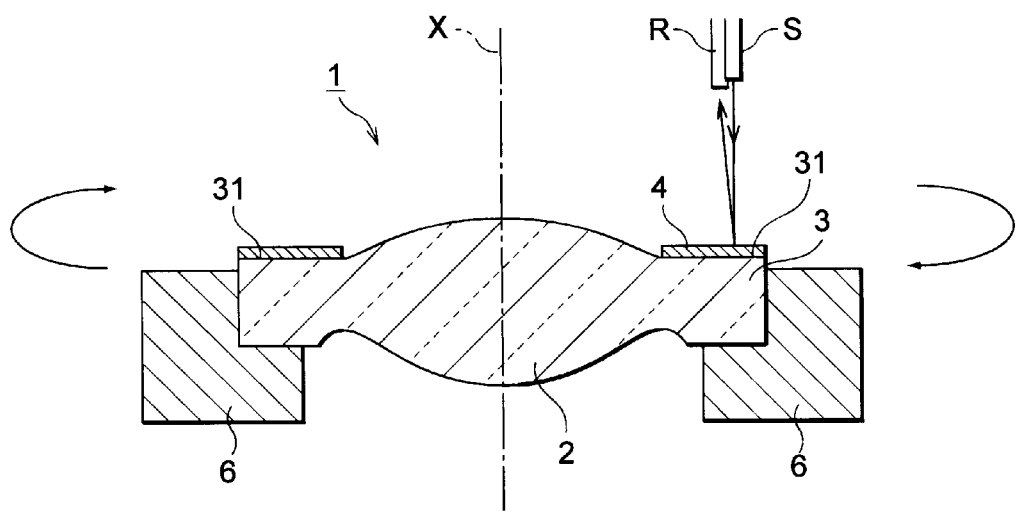
FIG. 2 is a sectional view of the plastic lens shown in FIG. 1 upon assembling.

First, upon attaching the lens 1, as shown in FIG. 2, the lens 1 is temporarily assembled to the holder 6, which is at a predetermined attaching position. The photosensor which has the light-sending portion S and the light-detecting portion R is disposed above the flange 3 near its outer peripheral portion. The photosensor is positioned beforehand such that, when the lens 1 is normally assembled without any inclination, the light emitted from the light-sending portion S is reflected by the light detecting film 4 so as to be received by the light-receiving portion R. Here, a photosensor in which the light-sending portion S and light detecting portion R are integrated together may be used as well.

After the plastic lens 1 is temporarily assembled, while light is continuously emitted from the light-sending portion S, the lens 1 is rotated at a constant speed together with the holder 6. This rotation is effected around an virtual axis. This virtual axis corresponds to the optical axis X of the optically functioning portion 2, when the lens 1 is assembled with no inclination.

Figure 3:
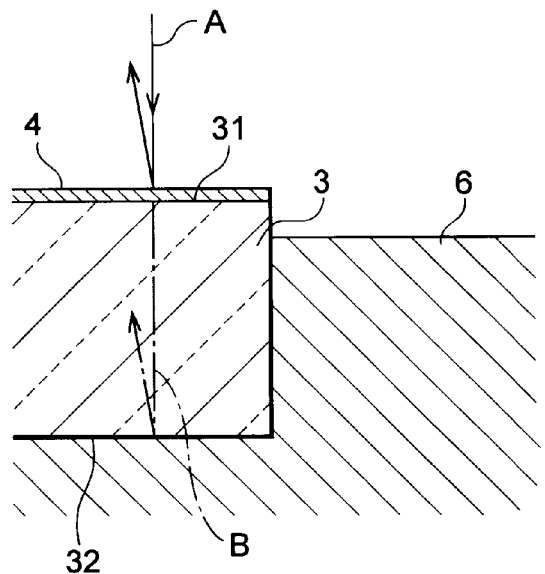
FIG. 3 is an enlarged sectional view of the plastic lens shown in FIG. 1 upon assembling.

In the case where the lens 1 is normally assembled with no inclination, as shown in FIG. 3, the emitted light is totally reflected by the light-reflecting film 4 toward the light detecting portion R, like the light A, and is not transmitted through the flange 3 like the light B depicted therein. light is not reflected by the rear face 32 (or surface of the holder 6) like the light B and then detected by the light detecting portion R. Accordingly, the inclination of the lens 1 can be detected securely.

When the lens 1 is assembled with an inclination, on the other hand, the emitted light is not totally reflected toward the light-receiving portion R, whereby the light received by the light-receiving portion R becomes weaker. In this case, though the light detected by the light-detecting portion R becomes weaker, the emitted light is totally reflected by the light-reflecting film 4, and is not transmitted through the flange 3 like the light B. Accordingly, the detection of inclination of the lens 1 can be detected securely.

When the strength of the light received by the light-receiving portion R is within a predetermined strength range, it can be judged that the lens 1 is assembled to the holder 6 without tilting. At the time of determining the range, the strength of the light reflected by correctly assembled lens and errors such as instrumental errors in mesurement are considered.

When the strength of the light received by the light detecting portion R is weaker than the above-mentioned predetermined range, it can be judged that the lens 1 is in a tilted state. In the case where the lens 1 is tilted, the lens 1 is reassembled to the holder 6 or adjusted by an inclination-adjusting mechanism provided in the holder 6, so that the inclination of the lens becomes normal. After the adjusting to a normal inclination, the lens 1 is bonded and secured to the holder 6 by an adhesive.

A second embodiment of the plastic lens in accordance with the present invention will now be explained with reference to FIGS. 4 and 5.

Figure 4:
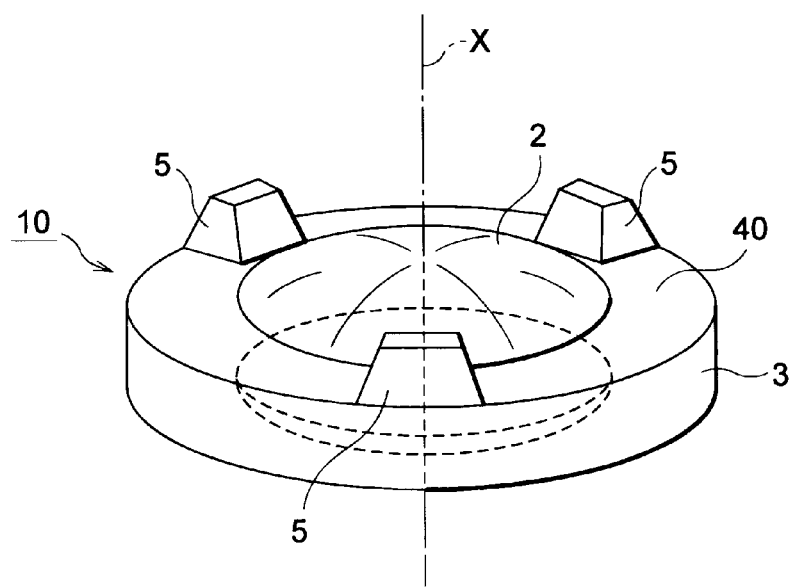
FIG. 4 is a perspective view showing a second embodiment of the plastic lens in accordance with the present invention.
Figure 5:
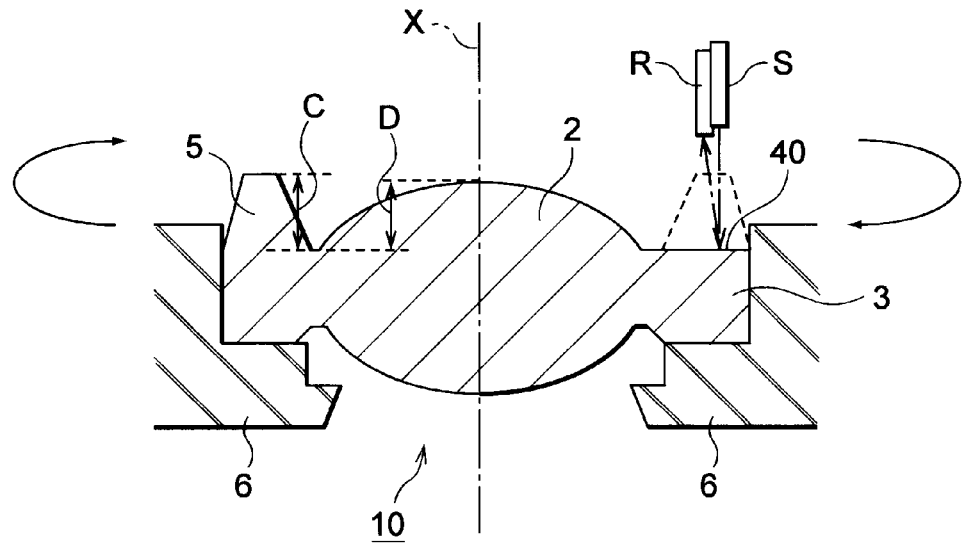
FIG. 5 is a sectional view of the plastic lens shown in FIG. 4 upon assembling.

Since a plastic lens 10 shown in FIG. 4 is configured substantially the same as the lens shown in FIG. 1, constituents identical or equivalent to those in the lens shown in FIG. 1 will be referred to with numerals or letters identical thereto, without their detailed explanations provided. The lens 10 shown in FIG. 4 differs from the lens 1 shown in FIG. 1 in that the reflecting plane is formed by a glossy plane 40, and that three protect projections 5 are formed on the reflecting plane (glossy plane 40) of the flange 3.

The surface of the flange 3 formed around the optically functioning portion 2 is made of the glossy plane 40, excluding the area of the protect projections 5. Also, the glossy plane 40 is formed perpendicular to the optical axis X of the optically functioning portion 2.

The surface roughness of the glossy plane 40 is preferably not greater than 0.3a in terms of center line average roughness. When the surface roughness of the glossy plane 40 exceeds 0.3a in terms of center line average roughness, the strength of the light reflected by the glossy plane 40 becomes weaker, thereby increasing the possibility of the inclination of the lens 10 being erroneously detected. On the other hand, though the inclination of the lens 10 can be detected more favorably as the surface roughness of the glossy plane 40 becomes smaller; when the center line average roughness is lower than 0.01a, it gradually becomes difficult to form the glossy plane 40 and tends to incur more time and labor therefor.

Consequently, in order to more securely detect the inclination of the lens 10 by the light reflected from the glossy plane 40 and reduce the time and labor for forming the glossy plane 40 at the same time at a high level, it is particularly preferable that the surface roughness of the glossy plane 40 be 0.025a to 0.2a in terms of center line average roughness.

In order to form the glossy plane 40, the inner face of the molding die for forming the surface of the flange 3 is polished with an abrasive such as diamond-paste. When the lens 10 is molded by this molding die, the polished inner face of the die is transferred to the surface of the flange 3. The transferred surface is formed as a plane having a gloss, i.e., the glossy plane 40. Here, the surface of the flange 3 may be polished after molding so as to form the glossy plane 40. When no protect projection 5 is provided, the surface of the flange 3 can be easily polished after molding.

The protect projections 5 formed on the surface of the flange 3, each having a sustancially trapezoidal sectional figure, are curved along the outer peripheral portion of the flange 3 with equally spaced intervals. The upper face of the protect projection 5 is not formed as a glossy plane but a plane which has slight irregularities. The upper face of the protect portion 5 reflects the light emitted from the light-sending portion S diffusively.

Also, since the protect projections 5 are disposed on the side of the glossy plane 40, the glossy plane 40 is prevented from directly coming into contact with the inner face of a case for carrying the lens 10 or the like before the lens 10 is assembled. Consequently, the glossy plane 40 would not be damaged. And also, as shown in FIG. 5, on the basis of the glossy plane 40, the height C of the protect projection 5 is made greater than the maximum height D of the optically functioning portion 2. The optically functioning portion 2 is prevented from directly coming into contact with the inner face of a case for carrying the lens 10 or the like before the lens 10 is assembled, and is also prevented from directly coming into contact with a CD-ROM disc or the like after the lens 10 is assembled. Consequently, the optically functioning portion 2 would not be damaged.

The rear face of the flange 3, which becomes a base surface when being attached to the holder 6, is formed as a mere annual plane. Since the inclination of the lens 10 is detected by the glossy plane 40 of the surface of the flange 3, the rear face of the flange 3 is not needed to be made as a surface having a gloss.

A process of detecting the inclination of the plastic lens 10 upon attaching will now be explained with reference to FIG. 5.

First, the lens 10 is temporarily assembled to the holder 6, which is at a predetermined attaching position. Then, while light is continuously emitted from the light-sending portion S, the lens 10 is rotated at a constant speed together with the holder 6. This rotation is effected around an virtual axis. This virtual axis corresponds to the optical axis X of the optically functioning portion 2, when the lens 10 is assembled with no inclination.

In the case where the lens 10 is normally assembled with no inclination, while the light emitted from the light-sending portion S illuminates the glossy plane 40, the emitted light is substantially reflected toward the light detecting portion R by the glossy plane 40. While the light emitted from the light-sending portion S illuminates the upper face of the protect projections 5, the light is diffused thereby, so that the light received by the light detecting portion R becomes weaker. These are repeated in a predetermined cycle. In the case where the lens 10 is assembled with an inclination, by contrast, the light emitted from the light-sending portion S is not totally reflected toward the light detecting portion R even while illuminating the glossy plane 40, whereby the light received by the light detecting portion R would become weaker.

Figure 6:
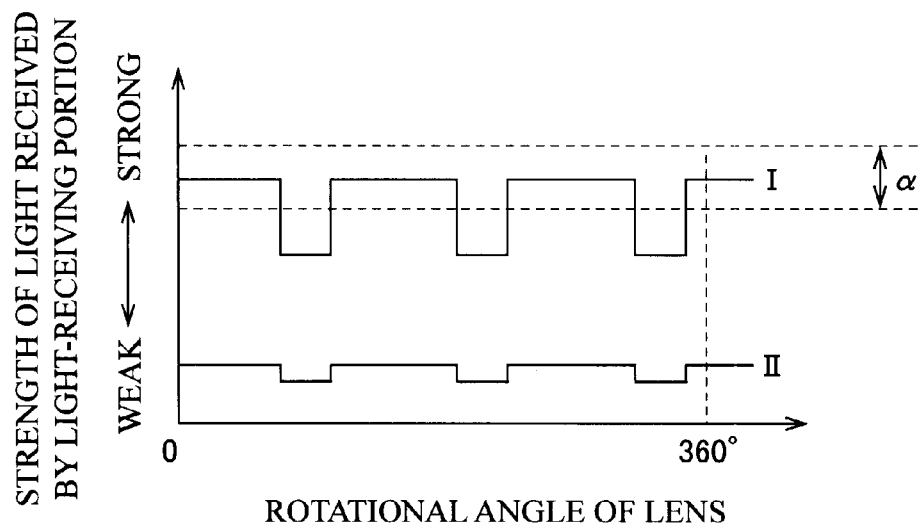
FIG. 6 is a graph showing the strength of light received by a light-receiving portion when the inclination of the plastic lens shown in FIG. 5 is being detected.

Thus, when the strength of the light received by the light detecting portion R is within a predetermined range of strength α as indicated by I in FIG. 6, it can be judged that the lens 10 is assembled without inclination. At the time of determining the range α, the strength of the light reflected by correctly assembled lens and errors such as instrumental errors in mesurement are considered. It is needless to mention that, when the emitted light illminates only the glossy plane 40 except the area of the protect projections 5 or when the protect projection 5 is not provided, the strength of the detected light would become flat.

In the case where the strength of the detected light is weaker than the above-mentioned range α as indicated by II in FIG. 6, it can be considered that the emitted light is not reflected toward the light detecting portion R, whereby the lens 10 can be judged to be in a tilted state. In the case where the lens 10 is tilted, the lens 10 is reassembled to the holder 6 or adjusted by an inclination-adjusting mechanism provided in the holder 6, so that the inclination of the lens 10 becomes normal. After adjusting to a normal inclination, the lens 10 is bonded and secured to the holder 6 by an adhesive.

Figure 7:
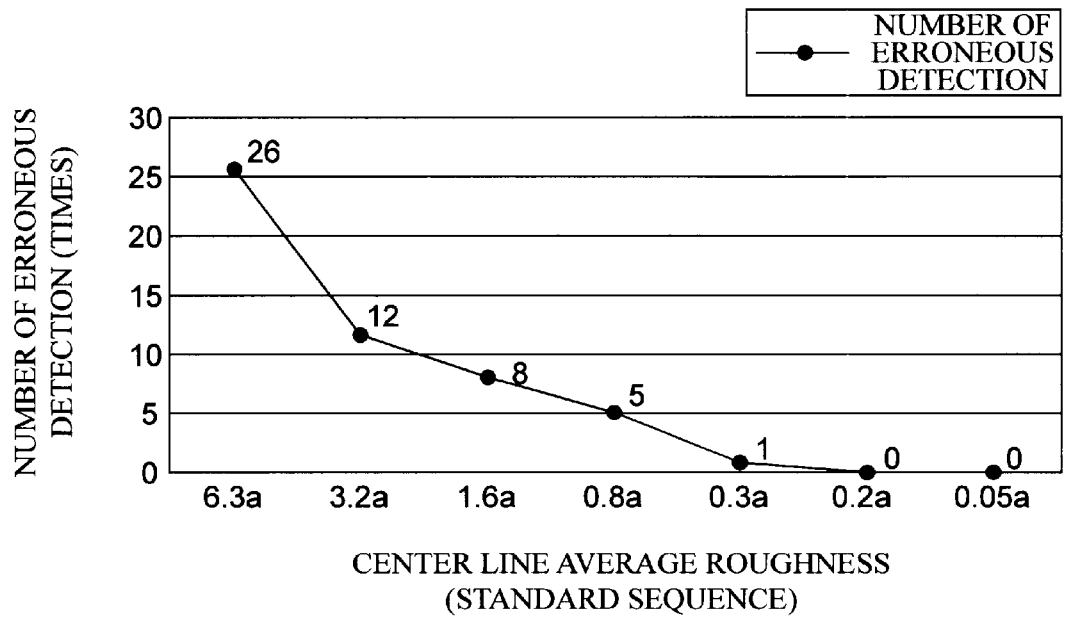
FIG. 7 is a graph showing results of a test concerning a relationship between surface roughness of a glossy plane and number of erroneous detection.
Figure 8:
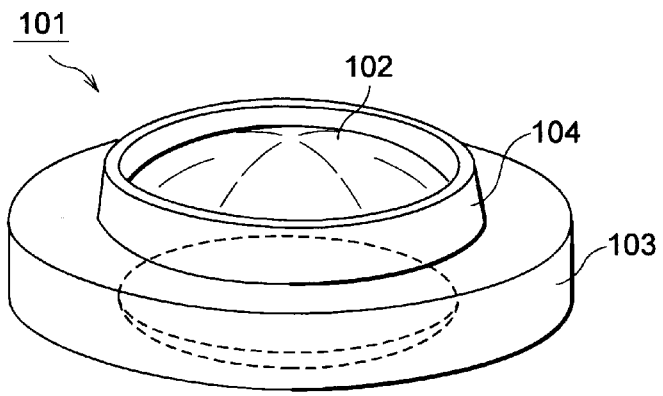
FIG. 8 is a perspective view showing a conventional plastic lens.
Figure 9:
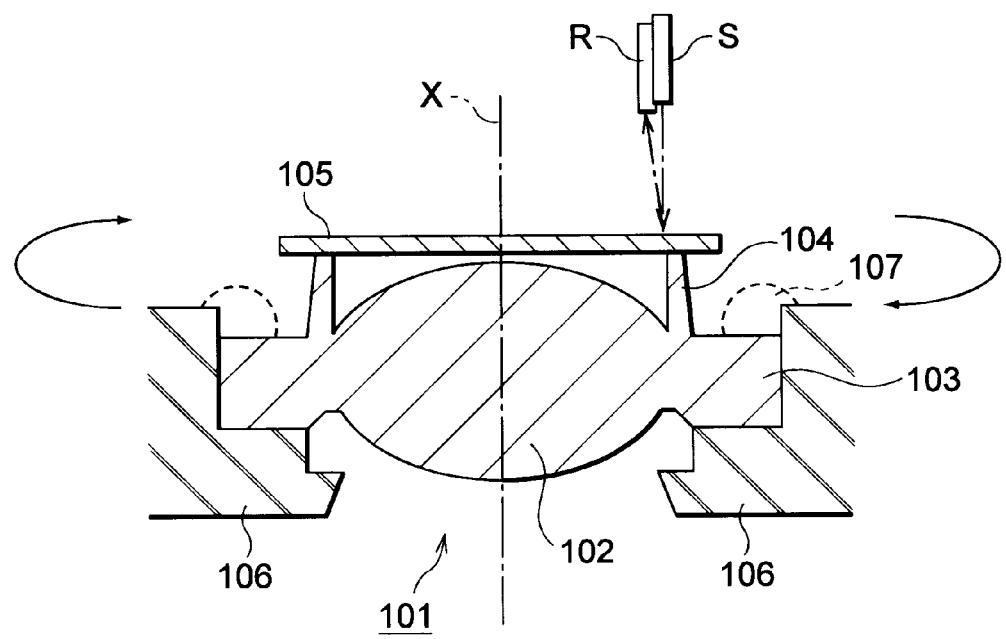
FIG. 9 is a sectional view of the conventional plastic lens upon assembling.

The graph of FIG. 7 shows the results of a test concerning a relationship between the surface roughness of the glossy plane 40 and erroneous detection. In the test, 100 pieces each of the lenses 10 in which the surface roughness of the glossy plane 40 was 6.3a, 3.2a, 1.6a, 0.8a, 0.3a, 0.2a, and 0.05a in terms of center line average roughness were prepared, and the inclination of each lens 10 was detected. The results are expressed as the number of erroneous detection ("erroneous detection" means that the inclination of the lens could not be detected correctly) occurring in 100 times of detection. As can be seen from the graph of FIG. 7, erroneous detection hardly occurs when the surface roughness of the glossy plane 40 becomes 0.3a or less in terms of the center line average roughness. In particular, when the surface roughness of the glossy plane 40 is 0.2a or less, no erroneous detection would occur.

Thus, as the inclination of the lens 1, 10 can be detected by use of the reflecting plane (light-reflecting film 4 or glossy plane 40) formed on the lens 1, 10 itself, there is no need for the additional step of handling a special instrument such as reflecting glass, which is used only upon detecting the inclination, whereby the lens can be assembled efficiently. Also, since the inclination of the lens is directly detected without the aid of a special instrument such as reflecting glass, the inclination of the lens can be detected more accurately, thus allowing the lens to be assembled correctly.

Though each of the above-mentioned plastic lenses 1 and 10 is a small-sized lens used for an optical pickup of a CD-ROM drive or the like, the application of the plastic lens in accordance with the present invention should not be restricted to that of the above-mentioned plastic lenses 1 and 10.

As explained in the foregoing, the present invention can yield the following effects.

Namely, since it has a flange around the outer periphery of an optically functioning portion, and the surface of the flange positioned around the optically functioning portion is made as a reflecting plane perpendicular to the optical axis of the optically functioning portion, the inclination upon assembling can be detected and adjusted efficiently and accurately. From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A plastic lens comprising:

an optically functioning portion;

a flange surrounding said optically functioning portion; and a reflecting plane perpendicular to an optical axis of said optically functioning portion and located on a surface of said flange.

2. A plastic lens according to claim 1, wherein said reflecting plane is a light-reflecting film.

3. A plastic lens according to claim 2, wherein said flange has a plurality of protect projections protruding from said reflecting plane side, each of said protect projections having a height, relative to said reflecting plane, greater than a maximum height of said optically functioning portion.

* * * * *